(12) United States Patent
Yao et al.

(10) Patent No.: US 7,821,974 B2
(45) Date of Patent: Oct. 26, 2010

(54) UMTS RIL EXTENSION

(75) Inventors: Richard Yuqi Yao, Morris Plains, NJ (US); Zihua Guo, Beijing (CN); Yidong Wang, Beijing (CN); Pung Pengyang Xu, Sammamish, WA (US); Steven Elliott, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 11/092,062

(22) Filed: Mar. 29, 2005

(65) Prior Publication Data

US 2006/0222009 A1    Oct. 5, 2006

(51) Int. Cl.
*H04B 7/00* (2006.01)

(52) U.S. Cl. .................. 370/310; 370/469; 719/328

(58) Field of Classification Search ............... 370/315, 370/342, 313, 469, 252, 254, 310, 328, 330, 370/349, 466, 485, 329; 455/418, 423, 439, 455/552.1, 557, 558; 719/311, 313, 318, 719/320, 321, 322, 327, 328, 329
See application file for complete search history.

(56) References Cited

U.S. PATENT DOCUMENTS

| | | | | |
|---|---|---|---|---|
| 6,826,762 | B2 * | 11/2004 | Shell et al. | 719/328 |
| 7,100,166 | B2 * | 8/2006 | Takatama et al. | 719/318 |
| 7,162,408 | B2 * | 1/2007 | Kashyap et al. | 703/24 |
| 7,426,737 | B2 * | 9/2008 | Hellenthal et al. | 719/328 |
| 7,707,592 | B2 * | 4/2010 | Wesslen et al. | 719/328 |
| 2003/0007510 | A1 * | 1/2003 | Yeo et al. | 370/469 |
| 2003/0104814 | A1 * | 6/2003 | Gwon et al. | 455/436 |
| 2003/0181193 | A1 * | 9/2003 | Wilhelmsson et al. | 455/403 |
| 2003/0221024 | A1 * | 11/2003 | Arroyo et al. | 709/331 |
| 2004/0002936 | A1 * | 1/2004 | Majumder et al. | 707/1 |
| 2004/0054923 | A1 * | 3/2004 | Seago et al. | 713/201 |
| 2004/0204035 | A1 * | 10/2004 | Raghuram et al. | 455/553.1 |
| 2004/0228315 | A1 * | 11/2004 | Malkamaki | 370/342 |
| 2005/0004972 | A1 * | 1/2005 | Meskauskas | 709/200 |
| 2005/0079890 | A1 * | 4/2005 | Yu | 455/557 |
| 2005/0083899 | A1 * | 4/2005 | Babbar et al. | 370/342 |
| 2005/0088999 | A1 * | 4/2005 | Waylett et al. | 370/338 |
| 2005/0131671 | A1 * | 6/2005 | Kashyap et al. | 703/24 |
| 2005/0169205 | A1 * | 8/2005 | Grilli et al. | 370/313 |
| 2005/0198257 | A1 * | 9/2005 | Gupta et al. | 709/224 |
| 2005/0221824 | A1 * | 10/2005 | Lee et al. | 455/435.2 |

(Continued)

OTHER PUBLICATIONS

Radio interface layer White paper, Microsoft Corporation, Jun. 2004, Intrinsyc Europe Limited.*

*Primary Examiner*—Aung S Moe
*Assistant Examiner*—Abdullah Riyami
(74) *Attorney, Agent, or Firm*—Woodcock Washburn LLP

(57) ABSTRACT

A UMTS extension to the GSM/GPRS RIL is disclosed. The UTMS RIL provides an API set interface for the support of UMTS features such as 3G QoS, secondary PDP contexts call, priority service, voice group call and voice broadcast services, etc. The API set is based on the UMTS AT command interface as defined in 3GPP specification TS 27.007. The architecture of the UMTS RIL is designed as a standard interface with APIs and callback mechanisms that can be used across different platforms and multi-radio hardware such as GSM, GPRS, WCDMA, and HSDPA. The UTMS RIL may enable various applications running on mobile platforms in 2G, 2.5G, and 3G cellular radio stacks to issue commands without knowledge of underlying radio hardware structure.

19 Claims, 5 Drawing Sheets

U.S. PATENT DOCUMENTS

| | | | |
|---|---|---|---|
| 2005/0245261 A1* | 11/2005 | Ejzak | 455/436 |
| 2005/0281233 A1* | 12/2005 | Parker | 370/338 |
| 2006/0003757 A1* | 1/2006 | Subramanian et al. | 455/418 |
| 2006/0073851 A1* | 4/2006 | Colando et al. | 455/566 |
| 2006/0105815 A1* | 5/2006 | Jendbro et al. | 455/566 |
| 2006/0123025 A1* | 6/2006 | DeMello et al. | 707/100 |
| 2006/0128369 A1* | 6/2006 | El Husseini et al. | 455/418 |
| 2006/0153101 A1* | 7/2006 | Raisanen | 370/260 |
| 2006/0199614 A1* | 9/2006 | Hyacinthe | 455/558 |
| 2006/0223522 A1* | 10/2006 | Guo et al. | 455/423 |
| 2006/0225082 A1* | 10/2006 | Yao et al. | 719/328 |
| 2006/0248206 A1* | 11/2006 | Moerdijk et al. | 709/230 |
| 2006/0251000 A1* | 11/2006 | Williams | 370/315 |
| 2007/0041330 A1* | 2/2007 | Bostica et al. | 370/252 |
| 2007/0133563 A1* | 6/2007 | Hundscheidt et al. | 370/395.43 |
| 2007/0173228 A1* | 7/2007 | Funnell et al. | 455/410 |
| 2008/0049713 A1* | 2/2008 | Yam | 370/349 |
| 2008/0064393 A1* | 3/2008 | Oommen et al. | 455/432.1 |
| 2008/0092149 A1* | 4/2008 | Rowbotham et al. | 719/321 |
| 2010/0048179 A1* | 2/2010 | Cardina et al. | 455/412.2 |

* cited by examiner

UMTS RIL EXTENSION

FIELD OF THE INVENTION

The invention relates generally to application programming interfaces (APIs). More particularly, the invention relates to APIs for a Universal Mobile Telecommunications System (UMTS) radio interface layer (RIL) having APIs to support certain UMTS functions and to enhance global system for mobile (GSM) interoperability.

BACKGROUND OF THE INVENTION

Mobile telephones are becoming commonplace. As users become more accustomed to using mobile telephones, they are requesting more sophisticated uses of telephones. Ideally, users would like their mobile telephones to perform the same functions as their personal computers or hand-held personal digital assistants (PDAs). Implementing such uses in a mobile telephone environment requires application developers to develop or adapt their software for use on a mobile telephone. However, adapting or developing software for use on one original equipment manufacturer's (OEM's) mobile telephone does not necessarily guarantee that the software application will function on another OEM's mobile telephone due to the different radio implementations of different OEMs and due to the differences in different mobile environments.

In order to create a software solution adaptable to multiple different mobile systems and radios, there is a need for some kind of a hardware adaptation layer, i.e., a layer that isolates the specifics of a particular mobile system/hardware from the bulk of the software system. Such a layer, the radio interface layer (RIL), already exists. The RIL is a set of APIs providing a level of abstraction between the radio on a mobile phone and the software of the mobile phone. The RIL API set is roughly based on the Global System for Mobile Communication (GSM) AT interface as defined in GSM specifications 07.05 and 07.07.

The API set provides access to functionality contained within a cellular telephone, such as a GSM or CDMA compatible telephone. Applications running on an operating system in the mobile telephone are allowed to issue commands without knowledge of the underlying radio structure of the mobile telephone and without specific knowledge of the modem-type commands. For example, the applications may be allowed to access phonebook entries, restrict access to data and functionality using passwords, access file and message storage, and perform many other functions.

Unfortunately, the packet-switched data transmission services of the GSM system and the packet transmission service of the UMTS system are not fully compatible with each other. For example, the General Packet Radio Service (GPRS) packet transmission service deviates from the UMTS standard with respect to quality of service (QoS) alternatives that can be defined for the data transmission connection. Thus, when using a wireless terminal, the problem may arise that a data transmission connection can be established only to a mobile communication network of a particular type.

There is a need, therefore, to extend the RIL to include an API set supporting UMTS features in Windows Mobile platforms for 3G Smartphone and PocketPC devices. More particularly, there is a need to extend the GSM RIL with new APIs to support such features as 3G QoS, multiple PDP context, 2G and 3G switching, voice group call service, and voice broadcast call service. It would be particularly desirable if such an RIL extension were based on 3GPP specification TS 27.007 AT command base information for communication between the modem and the operating system.

SUMMARY OF THE INVENTION

This invention provides an API set supporting UMTS features in mobile platforms for 3G Smartphone and PocketPC devices. The UMTS RIL provides an interface for communications between Microsoft Windows Mobile software, for example, and the UMTS radio stack. More specifically, the present invention extends the GSM RIL with new APIs to support the following features: 3G QoS, Multiple PDP context, 2G and 3G switching, Voice group call service, and Voice broadcast call service.

The UMTS RIL is an extension of the GSM/GPRS RIL that provides an API set interface for the support of UMTS features such as 3G QoS, secondary PDP context, call priority service, voice group call and voice broadcast services, etc. The API set of the RIL is based on the UMTS AT command interface as defined in 3GPP specification TS 27.007, the contents of which are incorporated herein by reference. The architecture of UMTS RIL is designed as a standard interface with APIs and callback mechanisms that can be used across different platforms and multi-radio hardware such as GSM, GPRS, WCDMA (Wideband Code Division Multiplexing Access), and HSDPA (High-Speed Downlink Packet Access). Accordingly, the UMTS RIL is capable for backward compatible with GSM/GPRS radio access networks.

The UTMS RIL may enable various applications running on Windows Mobile platforms in 2G, 2.5G, and 3G cellular radio stacks to issue commands without knowledge of underlying radio hardware structure. In addition to the applications supported in GSM/GPRS networks, the UTMS RIL may support: 1) multi-session applications such as simultaneous voice and data, video telephony, push-to-talk, multiplayer interactive gaming, etc.; 2) 3G QoS provision such as requested, minimum, and negotiated QoS profile; and 3) roaming between 2G/2.5G and 3G, 3G and non-3GPP networks (e.g., 802.11 a/b/g based WLAN, 802.16 based WLAN).

DETAILED DESCRIPTION OF ILLUSTRATIVE EMBODIMENTS

Example Computing Environment

Figure 1:
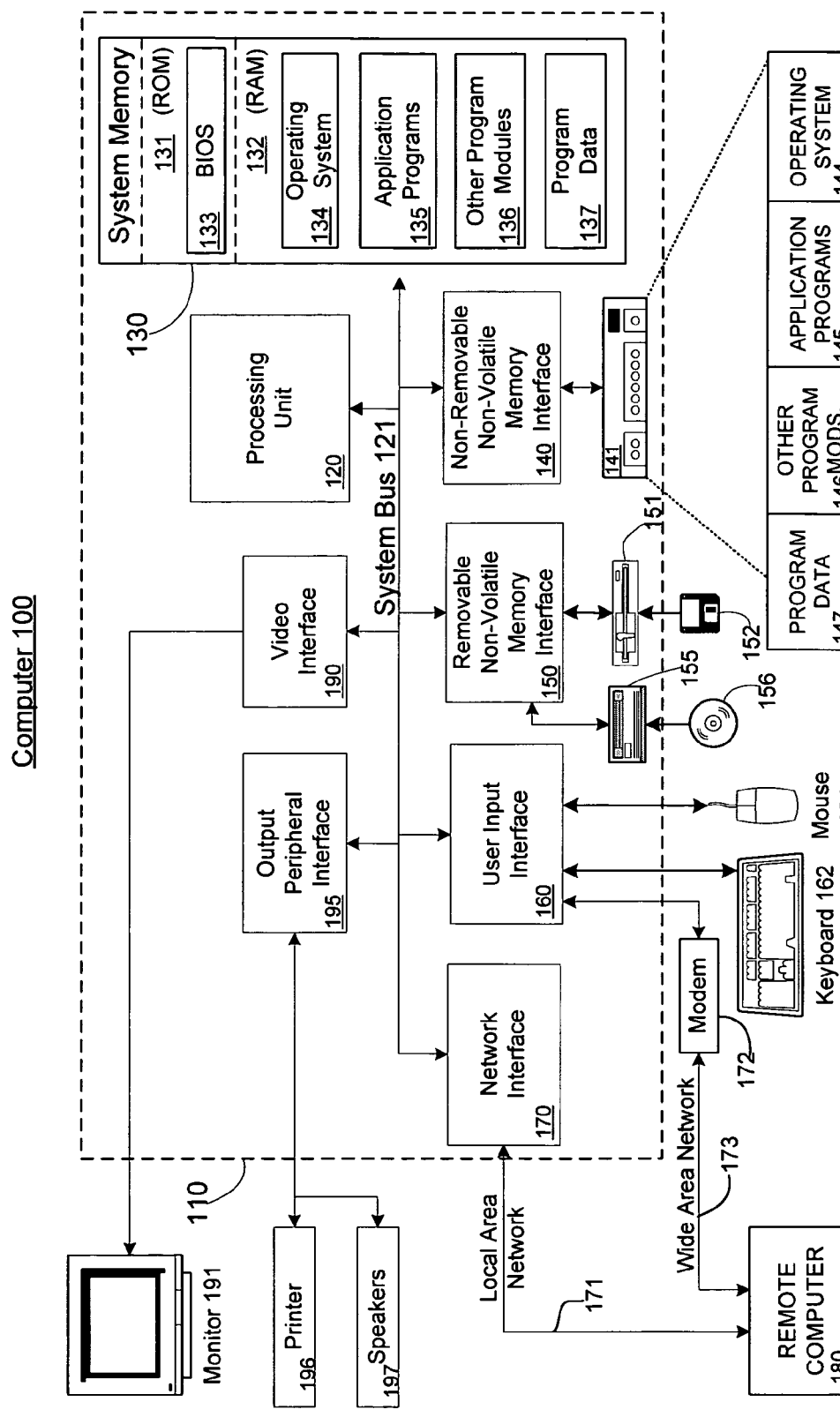
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Radio Interface Layer

Figure 2:
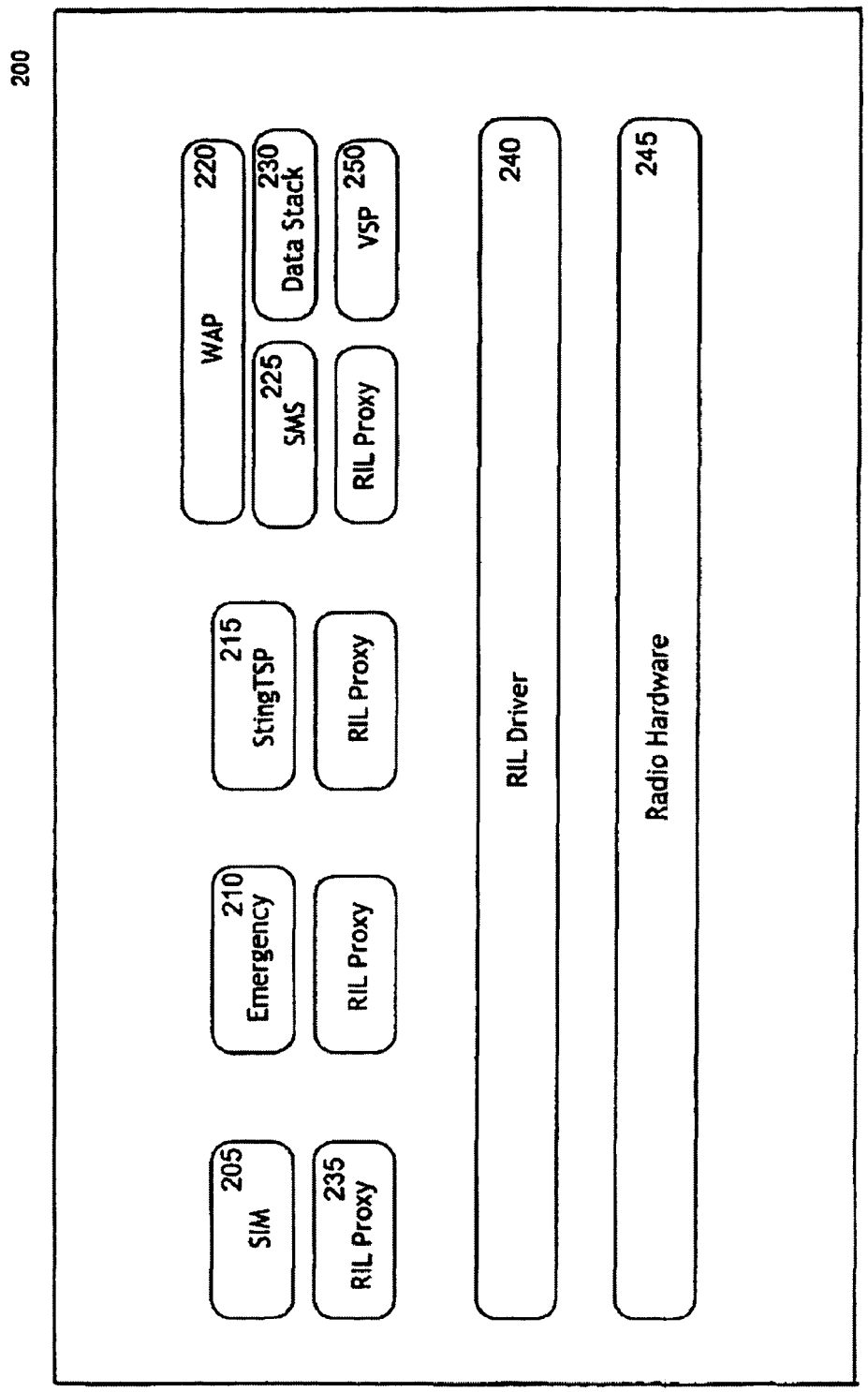
FIG. 2 is a block diagram illustrating a radio interface layer (RIL).

FIG. 2 is a block diagram illustrating an example embodiment of a radio interface layer (RIL). U.S. Pat. No. 6,826,762 ("the 762 patent") discloses and claims such an RIL in a cell phone with a set of APIs having a hardware-independent proxy layer and a hardware-specific driver layer. The disclosure of the 762 patent is incorporated herein by reference.

The RIL may include an API set which provides a level of abstraction between the radio on a cell phone and the software of the cell phone. The API set of RIL may be based on the GSM AT interface as defined in GSM specifications 07.05 and 07.07. The API set may provide access to functionality contained within a cellular telephone, such as a GSM or CDMA compatible telephone. Applications running on an operating system in the cellular telephone may issue commands without knowledge of the underlying radio structure of the cellular telephone and specific knowledge of the modem-type commands. For example, the applications may access phonebook entries, restrict access to data and functionality using passwords, access file and message storage, and perform many other functions.

The RIL may be divided into a hardware-independent proxy layer, called by various software components, and a driver layer that may be hardware-specific. It should be understood that an original equipment manufacturer (OEM) may replace the driver layer with their own layer containing implementation specific to their hardware. In an example embodiment, the RIL may be a core component of a cellular telephone.

The RIL driver layer may be used to implement and roughly correspond to the commands, such as AT commands, specified by ETS 300 585, Digital cellular telecommunications system (Phase 2); Use of Data Terminal Equipment-Data Circuit terminating Equipment (DTE-DCE) interface for Short Messaging Service (SMS) and Cell Broadcast Service (CBS) (GSM 07.05), Fifth Edition, April 1997, and ETS 300 642, Digital cellular telecommunications system (Phase 2); AT command set for GSM Mobile Equipment (ME) (GSM 07.07 version 4.4.1), Fourth Edition, March 1999. The GSM specifications 07.05 and 07.07 are hereby incorporated by reference. Of course, the RIL driver may be used to implement and correspond to other command sets, such as CDMA commands, or a combination of several command sets.

OEMs may use the RIL driver of the preferred embodiment or tweak it if they would rather talk with their radio over private APIs instead of via AT commands (most likely for performance reasons).

Generally described, the RIL driver layer may receive an RIL API call and cause the radio (i.e., the receiver/transmitter of the cellphone, PDA, etc.) to perform the function defined by the RIL API. The RIL driver may receive the RIL API call from a RIL proxy layer (described below). The RIL driver layer may also process notifications received from the radio and transmit them to the RIL proxy layer. In an example embodiment, the RIL driver layer may be a dynamic link library (DLL) that is running as a device driver inside the process space of a device manager (the standard module that manages device drivers on the "WINDOWS CE" operating system). A Device Manager (device.exe) may be responsible for managing all the system drivers, including the RIL driver.

The RIL proxy layer may include a layer that is called by various other layers of the core architecture, such as a telephony service provider (TSP) layer, an extended telephony API (EXTAPI) layer, and a subscriber identity module (SIM) Manager using the platform specific commands of these core architectures. In an example embodiment, the proxy layer may be a "WINDOWS CE" dynamic link library (DLL) that manages notifications, callback function, and inter-process function calls into the RIL driver layer. Modules that want to use the RIL simply link with this proxy DLL. The RIL proxy layer converts the core architecture specific commands into RIL API calls that will be understood by the RIL driver layer.

There are some important distinctions between the proxy and driver layers. In an example embodiment, a separate proxy instance may be created for each module using the RIL proxy DLL. On the other hand, the RIL device driver may be loaded only once and shared among all proxy layer instances. In other words, a module using the RIL may be aware that only one radio module exists, even though it links to its own proxy DLL. In addition, the Device Manager's control of the RIL driver implies that the proxy and driver live in separate processes (i.e., different address spaces). However, the "WINDOWS CE" operating system exposes mechanisms allowing the proxy and driver layers to communicate without being concerned with the process boundaries.

Another important architectural property of the RIL is that almost all of the functions may be asynchronous. When a module first registers with the RIL, it may pass in two callback functions. One may be used for unsolicited notifications, and the other for responses to function calls. For example, when the phone receives a new incoming call, RIL may use the unsolicited notification callback function to let each module know about the incoming call. Alternatively, when a module calls RIL to obtain the signal strength, the function call may immediately return a response identifier. Shortly thereafter, RIL may use the function response callback function to convey signal strength information to the module. To ensure that function response callbacks are correctly matched up with function calls, this callback structure may also contain the same response identifier value returned by the original function call. This asynchronous architecture may simplify RIL implementation. If a module needs to call RIL functions in a synchronous manner, it may need to make the function call and block until it receives the function response callback.

The RIL may include a virtual serial port (VSP). When an application makes a data connection, it may retrieve a handle to the virtual serial port (not the real data stream between the RIL and the radio). This allows the RIL to buffer and flow control the data stream so that control commands can be interjected. For example, suppose an application has set up a data connection and is browsing on the Internet. The virtual serial port may enable the RIL to interject control commands to check for things like signal strength, new SMS messages, etc. However, further suppose an application is receiving a facsimile. Due to strict timing issues in the case of a facsimile transmission, the RIL may enter a dedicated data mode where the application has full control of the virtual serial port. That is, the RIL may not attempt to interject any commands in the data stream. It should be understood that the VSP is similar to other communication ports and typically only one application can have the handle to the VSP at one time.

Referring now to FIG. 2, a block diagram illustrating an example embodiment of an RIL in a cellphone 200 will be described. The cellphone 200 may include a SIM manager 205, an emergency application 210, a TSP 215, a WAP layer 220, a SMS manager 225, a data stack 230, and a VSP 250.

The cellphone 200 may also include one or more instances of an RIL proxy layer 235. The RIL proxy layer 235 may provide communications between applications (such as the SIM manager 205, emergency application 210, TSP 215, WAP layer 220, SMS manager 225, and ExTAPI, among others) and an RIL driver layer 240. The RIL driver layer 240 may provide communications between the RIL proxy layer 235 and the radio hardware 245.

In terms of "using" the RIL (from the point of view of both an application designer and an OEM), the proxy and driver layers each expose a set of functions. For a program module to use the RIL, it only needs to use functions specified in the proxy header file and then link with the proxy DLL. The proxy DLL may be implemented by calling functions specified in the driver header file. The driver header file may be provided to OEMs and may define the functions that an OEM must implement. In an example embodiment, the implementation may be hardware specific, so each OEM will be responsible for its own driver implementation. However, one or more reference implementations of the driver (source code included) may be provided to OEMs to help them with this step. If an OEM uses radio hardware that is supported by one of these reference implementations, it may not need to revise the RIL code.

Figure 3:
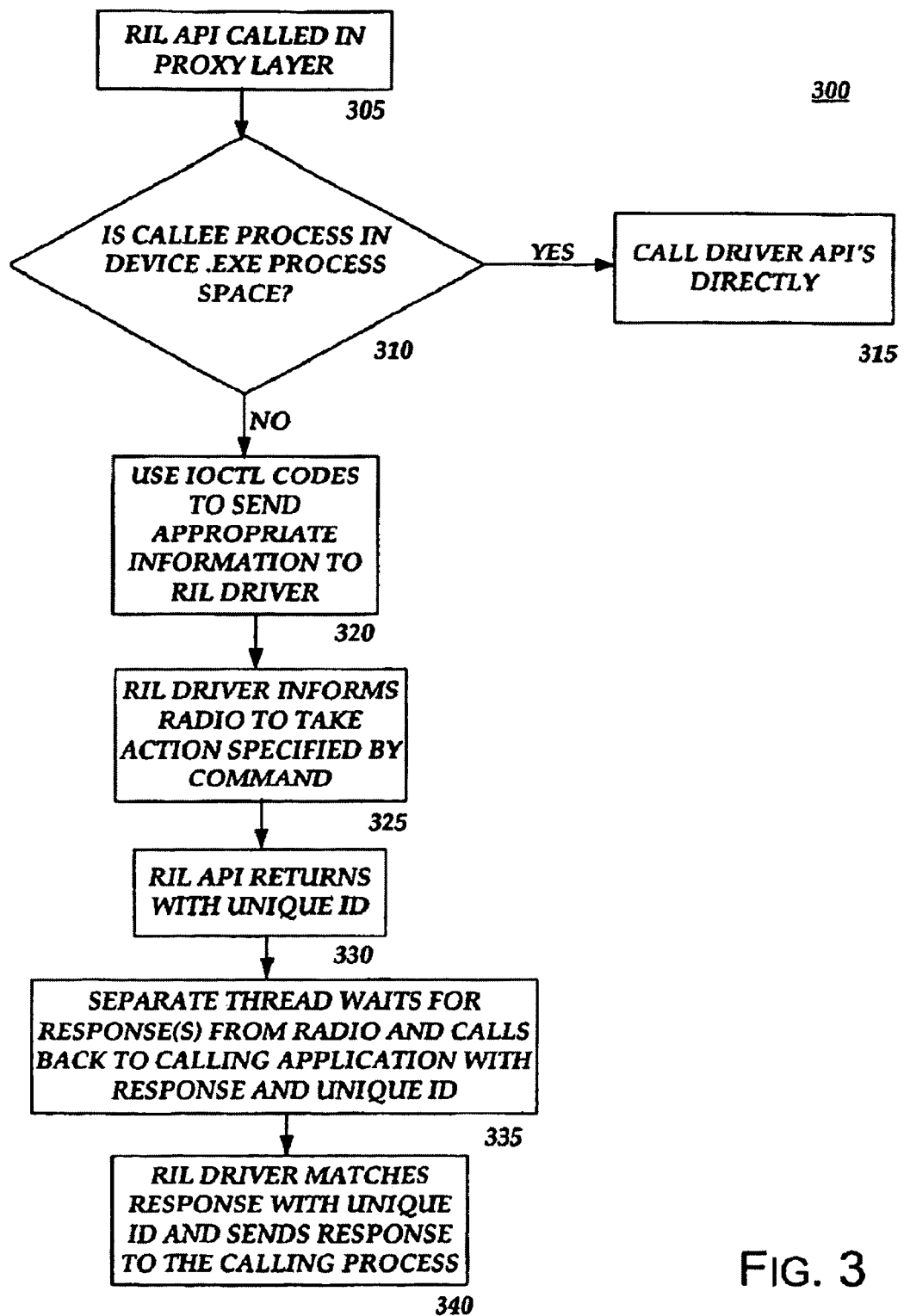
FIG. 3 is a flow diagram illustrating a method for processing of commands using an RIL.

FIG. 3 is a flow diagram illustrating a method 300 for processing of commands using an RIL as described above. The method 300 begins at step 305 when a user calls a RIL API in the proxy layer. At decision step 310, it is determined whether the callee, i.e., the called process, is in the device.exe process space. If it is, then the method proceeds to step 315 where the driver APIs are called directly. If it is determined at decision step 310 that the callee is not in the device.exe process space, then the method proceeds to step 320.

At step 320, input/output control (IOCTL) codes are used to send the appropriate information for the RIL API to the RIL driver running in a separate process space. At step 325, the RIL driver informs the radio to take the action specified by the command of the RIL API. In an example embodiment, the RIL driver informs the radio to take action using an AT command interface, as defined in GSM specs (most prominently 07.05 and 07.07). However, sending AT commands may not be ideal for a given radio—perhaps an OEM has a separate private API set that they can use to perform the same functionality as a given AT command. If this is the case, the OEM may change the RIL driver to suit their needs. However, in an example embodiment, because the core architecture of the phone has been built on top of a set of RIL APIs that may be implemented via AT commands, it is not necessary for the OEM to substantially modify the RIL driver so long as the radio understands AT commands. However, due to different implementations of the AT interface, some minor modifications may be necessary.

The method then proceeds to step 330 where the RIL API returns with a unique ID generated by the RIL. It should be understood that after sending an AT command, a response from the radio unit is awaited. RIL APIs may be asynchronous, so these APIs will return immediately, with a unique ID assigned to the call.

The method then proceeds to step 335 where a separate thread waits for responses from the radio unit.

The method then proceeds to step 340 where the RIL driver matches the response from the radio unit with the unique ID generated earlier and the RIL driver sends the response to the appropriate calling process via a callback function.

It should also be understood that radio units can also send unsolicited notifications (for example, when the phone switches cellular towers). In this case, the RIL driver receives a notification from the radio and will broadcast a message to all users of the RIL layer who are interested in this class of notification.

Figure 4:
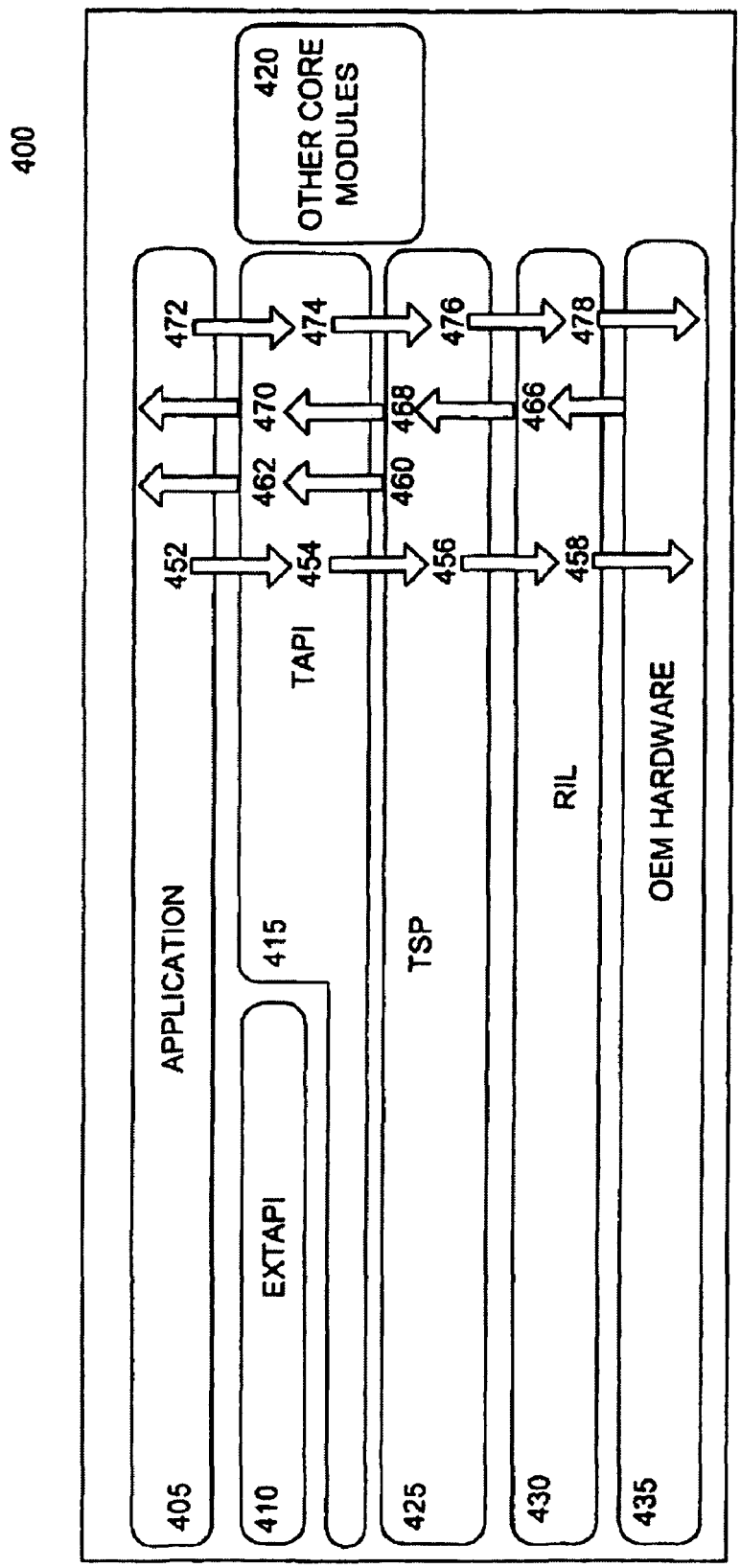
FIG. 4 is a block diagram illustrating a method for an application to establish a voice call using an RIL.

Referring now to FIG. 4, an example illustrating a method for an application to establish a voice call using RIL in accordance with an embodiment of the present invention will be described. It should be understood that establishing a voice call is only one of many functions that may be performed using the RIL APIs. The method outlined in FIG. 4 is illustrative of one of these functions (establishing a voice call). The method is implemented in telephone 400 that includes an application layer 405, an ExTAPI layer 410, a TAPI layer 415, other core modules 420, a TSP 425, a radio interface layer (RIL) 430, and OEM hardware 435. It should be understood that the method does not describe optional IOCTLs that may be present.

The method begins when application 405 calls the TAPI function: lineMakeCall (step 452). The TAPI layer 415 calls the TSP 425 with the following function call: TSPI_lineMakeCall (step 454). The TSP 425 calls the RIL with the following RIL function: RIL_Dial (step 456). The RIL initiates the phone call by sending the corresponding command to the OEM hardware (e.g., radio): e.g., ATDT 555-1234 (step 458). The TSP returns asynchronously a reply message to the TAPI layer indicating that the call has been initiated: LINE_REPLY message (step 460).

The TAPI layer forwards the reply message (LINE_REPLY) to the application (step 462). When the OEM hardware detects that a connection to the number has been made, then it sends a CONNECT response to the RIL (step 464). The RIL sends a message (RIL_NOTIFY_CONNECT) to the TSP indicating that a connection has been made (step 466). The TSP sends a state change message (LINE_CALLSTATE) to the TAPI layer (step 468). The TAPI layer forwards the state change message (LINE_CALLSTATE) to the application 405 (step 470).

When the application 405 wishes to drop the telephone call, it calls the TAPI layer with a hang-up request: (lineDrop) (step 472). The TAPI layer forwards the TSP the hang-up request: (TSPI_lineDrop) (step 474). The TSP handler passes the hang-up request to the RIL: (RIL_Hangup) (step 476). The RIL passes the hang-up request to the OEM hardware (e.g., ATH) (step 478).

The 762 patent provides tables that describe some of the features that may be implemented using an RIL, example data structures that may be passed as parameters to some RIL APIs and returned with some RIL notifications, some of the unsolicited RIL notifications that get passed to the notification callback, and some of the RIL functions broken down by group.

UMTS Extension To Radio Interface Layer

Figure 5:
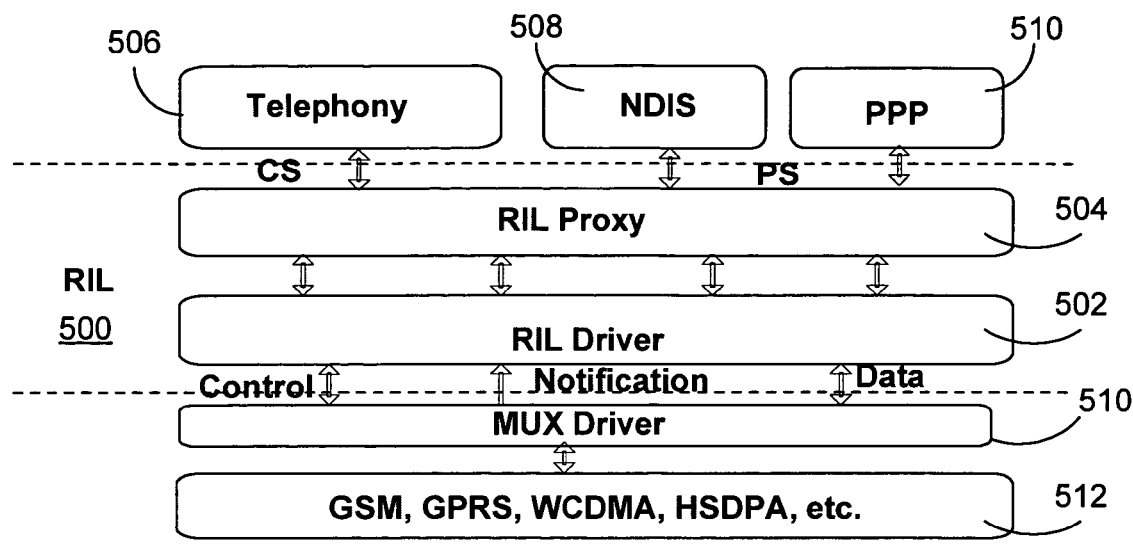
FIG. 5 is a block diagram illustrating a UTMS RIL.

The Universal Mobile Telecommunications System ("UMTS") extension to the RIL provides a communication interface between the system software and the wireless radio stack. The architecture of the UTMS RIL 500, as shown in FIG. 5, may be designed as a standard interface with APIs and callback mechanisms that can be used across different platforms and multi-radio hardware.

The RIL may be divided into two layers, a hardware-specific driver layer 502 (i.e., RIL Driver) which processes AT commands as defined in 3GPP 27.007 and events, and a hardware-independent proxy layer 504 (i.e., RIL Proxy) which performs arbitration between the multiple clients for access to the single RIL driver. The proxy layer 504 may be a Windows CE-based dynamic-link library (DLL) that manages notifications, callback function, and inter-process function calls into the driver layer 502. Upper-layer modules or clients (e.g., SMS, TSP in Telephony) use the RIL application programming interface (API) by linking to this proxy DLL. The RIL driver 502 services system requests for radio functionality including voice, circuit-switch (CS) and packet-switch (PS) data, SMS, and notifies the system of changes in the radio state, such as coverage, signal strength, and incoming calls. In particular, the UMTS RIL driver 502 provides the notification to the upper layer when the network changes between GSM/GPRS and WCDMA/HSDPA.

Thus, the RIL 500 may be divided into a hardware-independent proxy layer 504, called by various software components, and a driver layer 502 that may be hardware-specific. It should be understood that an OEM may replace the driver layer 502 with their own layer containing implementation specific to their hardware.

The telephony 506 may provide support for CS data features such as voice call, CS data connection, CS video telephony, SMS message, SIM/USIM, USAT, etc. The NDIS (Network Driver Interface Specification) 508 and PPP (Point-to-Point Protocol) 510 may be employed to support PS data features such as audio/video streaming, VoIP (Voice over IP), PS based video telephony, PTT (Push-to-Talk), etc. The multiplexer (MUX) driver 510, as defined in 3GPP TS 27.010, may be used to provide multiple concurrent channels to the radio protocol stack 512 allowing the RIL to perform several functions simultaneously.

An example embodiment of a UMTS RIL may include any or all of the following features. It should be understood that a UMTS RIL according to the invention may include other features in addition to, or instead of, those described below.

Secondary PDP context. The secondary PDP context may be used to activate a PDP context while reusing the PDP address and APN (Access Point Name) from an already active primary PDP context, but with a different QoS profile. When the downlink traffic flow arrives at access point on the GGSN, the packet classifier on GGSN will make a PDP Context selection based on the TFT (Traffic Flow Template) which is always associated with a PDP context during the Secondary PDP Context Activation procedure and is used to discriminate between different users payloads and incorporate packet filters, thus the traffic flow will be forwarded to that the secondary PDP Context with the suitable QoS attributes.

3G QoS profile. The 3G QoS profile supports four traffic classes such as conversational, streaming, interactive, and background classes for different type of applications with different QoS requirements, respectively. There are two QoS profiles for a PDP context, i.e., the requested QoS profile and minimum QoS profile, to provide different level QoS requirement.

Priority call service. The enhanced Multi-Level Precedence and Pre-emption Service (eMLPP) provides different call priorities in combination with fast call setup and pre-emption for different applications. The maximum precedence level of a subscriber is set at the subscription time by the service provider, based on the subscriber's need. The subscriber may select a precedence level up to and including the maximum precedence level subscribed to, on a per call basis.

Voice group call service (VGCS) and voice broadcast service (VBS). VGCS allows speech conversation of a pre-defined group of service subscribers in half duplex mode on the radio link taking into account multiple mobile service subscribers involved in the VGCS call per cell. VBS allows the distribution of speech, generated by a service subscriber, into a predefined geographical area to all or a group of service subscribers located in this area.

It should be understood that the foregoing description includes many implementation details that should not limit the scope of the present invention. For example, instead of using a proxy layer and a driver layer, the present invention may be implemented as a single abstraction layer between a telephony radio and a computer. The applications on the computer may communicate with the abstraction layer using top-level APIs. On the other hand, the telephony radio could respond to commands received from the abstraction layer.

It should also be understood from the foregoing description, that the present invention may be used with cellular telephones as well as other devices, such as hand-held PDA devices. Some of these other devices may not have a permanent radio module. Certain changes known to those skilled in the art may be necessary to implement the invention in a device without a permanent radio module.

A list of RIL APIs that may be used in connection with an example embodiment of the invention is included herewith. These APIs are provided as examples only and should not be construed as limiting the scope of the invention.

TABLE 1

APIs of UMTS Packet Domain

| API | AT Command | Description |
| --- | --- | --- |
| RIL__GetPDPContextList | +CGDCONT | This API retrieves a list of PDP contexts. |
| RIL__SetPDPContext | +CGDCONT | This API sets a particular PDP context. |
| RIL__DeletePDPContext | +CGDCONT | This API deletes a particular PDP context. |
| RIL__GetSecondaryPDPContextList | +CGDSCONT | This API retrieves a list of secondary PDP contexts. |
| RIL__SetSecondaryPDPContext | +CGDSCONT | This API sets a particular secondary PDP context. |
| RIL__DeleteSecondaryPDPContext | +CGDSCONT | This API deletes a particular secondary PDP context. |
| RIL__GetTrafficFlowTemplateList | +CGTFT | This API retrieves a list of traffic flow template |
| RIL__SetTrafficFlowTemplate | +CGTFT | This API sets a particular traffic flow template |
| RIL__DeleteTrafficFlowTemplate | +CGTFT | This API deletes a particular traffic flow template |
| RIL__GetRequestedQualityOfServiceList | +CGQREQ | This API gets the requested quality of service profile for all contexts. |
| RIL__SetRequestedQualityOfService | +CGQREQ | This API sets the requested quality of service profile for a context. |
| RIL__DeleteRequestedQualityOfService | +CGQREQ | This API deletes the requested quality of service profile for a context. |
| RIL__GetMinimumQualityOfServiceList | +CGQMIN | This API gets the minimum quality of service profile for all contexts. |
| RIL__SetMinimumQualityOfService | +CGQMIN | This API sets the minimum quality of service profile for a context. |
| RIL__DeleteMinimumQualityOfService | +CGQMIN | This API deletes the minimum quality of service profile for a context. |
| RIL__Get3GRequestedQualityOfServiceList | +CGEQREQ | This API gets the 3G requested quality of service profile for all contexts. |
| RIL__Set3GRequestedQualityOfService | +CGEQREQ | This API sets the 3G requested quality of service profile for a context. |
| RIL__Delete3GRequestedQualityOfService | +CGEQREQ | This API deletes the 3G requested quality of service profile for a context. |
| RIL__Get3GMinimumQualityOfServiceList | +CGEQMIN | This API gets the 3G minimum quality of service profile for all contexts. |
| RIL__Set3GMinimumQualityOfService | +CGEQMIN | This API sets the 3G minimum quality of service profile for a context. |
| RIL__Delete3GMinimumQualityOfService | +CGEQMIN | This API deletes the 3G minimum quality of service profile for a context. |
| RIL__Get3GNegotiatedQualityOfServiceList | +CGEQNEG | This API gets the 3G negotiated quality of service profile for all contexts. |
| RIL__GetPSAttached | +CGATT | This API gets the PS attach state. |
| RIL__SetPSAttached | +CGATT | This API sets the PS attach state. |
| RIL__GetPDPContextActivatedList | +CGACT | This API gets the PDP activation state for all contexts. |
| RIL__SetPDPContextActivated | +CGACT | This API sets the PDP activation state for a context. |
| RIL__ModifyPDPContext | +CGCMOD | This API modifies the PDP context. |
| RIL__EnterPSDataMode | +CGDATA | This API enters into a PS data state. |
| RIL__GetPDPAddress | +CGPADDR | This API gets the PDP address for a particular context. |
| RIL__SetPDPAutomaticAnswer | +CGAUTO | This API sets automatically answer an incoming PDP activate request. |
| RIL__GetPDPAutomaticAnswer | +CGAUTO | This API retrieves automatically answer an incoming PDP activate request. |
| RIL__PDPManualAnswer | +CGANS | This API sets manually answers an incoming PDP activation request. |
| RIL__GetGPRSClass | +CGCLASS | This API retrieves the current GPRS class. |
| RIL__SetGPRSClass | +CGCLASS | This API sets the current GPRS class. |
| RIL__GetGPRSRegistrationStatus | +CGREG | This API retrieves the current phone GPRS registration status. |

TABLE 1-continued

APIs of UMTS Packet Domain

| API | AT Command | Description |
|---|---|---|
| RIL_GetMOSMSService | +CGSMS | This API retrieves the preferred SMS service option for mobile-originated messages. It is reused by UMTS packet domain functions. |
| RIL_SetMOSMSService | +CGSMS | This API sets the preferred SMS service option for mobile-originated messages. |

TABLE 2

APIs of Call Control and Network Service

| API | AT Command | Description |
|---|---|---|
| RIL_GetMultipleCallSetting | +CDIP | This API retrieves the multiple calls numbers. |
| RIL_SetMultipleCallSetting | +CDIP | This API enables or disables the multiple calls numbers. |
| RIL_GetPriorityRegistrationStatus | +CAEMLPP | This API retrieves the user registration priority. |
| RIL_SetPriorityRegistrationStatus | +CAEMLPP | This API enables the user registration priority. |
| RIL_SetProtocolMode | +CPROT | This API sets information about protocol mode such as P2P mode. |
| RIL_GetSelectedPreferredPLMNList | +CPLS | This API retrieves the preferred PLMN list |
| RIL_SetSelectedPreferredPLMNList | +CPLS | This API set the preferred PLMN list |
| RIL_GetPrioritySubscriptionLevel | +CPPS | This API retrieves the registration priority subscription |
| RIL_GetFastCallPriorityLevel | +CFCS | This API retrieves the priority level for fast call setup |
| RIL_SetFastCallPriorityLevel | +CFCS | This API enables the priority level for fast call setup |
| RIL_GetAutoAnswerPriorityLevel | +CAAP | This API retrieves the priority level for automotive answering |
| RIL_SetAutoAnswerPriorityLevel | +CAAP | This API enables the priority level for automotive answering |
| RIL_GetUserToUserSignaling | +CUUS1 | This API retrieves the user to user signaling supplemental service 1 |
| RIL_SetUserToUserSignaling | +CUUS1 | This API enables the user to user signaling supplemental service 1 |

TABLE 3

APIs of Voice Group Call Service and Voice Broadcast Service

| API | AT Command | Description |
|---|---|---|
| RIL_AcceptIncomingVGCSVBSCall | +CAJOIN | This API accepts an incoming Voice Group or Voice Broadcast Call. |
| RIL_RejectIncomingVGCSVBSCall | +CAREJ | This API rejects an incoming Voice Group or Voice Broadcast Call |
| RIL_LeaveOngoingVGCSVBSCall | +CAHLD | This API leaves an ongoing Voice Group or Voice Broadcast Call |
| RIL_GetVGCSTalkerAccess | +CAPTT | This API retrieves Push to Talk function for VGCS talker access |
| RIL_SetVGCSTalkerAccess | +CAPTT | This API set Push to Talk function for VGCS talker access |
| RIL_GetVGCSUplinkStatus | +CAULEV | This API retrieves Voice Group Call Uplink status presentation |
| RIL_SetVGCSUplinkStatus | +CAULEV | This API sets Voice Group Call Uplink status presentation |
| RIL_GetVGCSVBSCallList | +CALCC | This API lists current Voice Group and Voice Broadcast calls |
| RIL_GetVGCSVBSStateAttribute | +CACSP | This API retrieves Voice Group or Voice Broadcast Call state attribute presentation |
| RIL_SetVGCSVBSStateAttribute | +CACSP | This API sets Voice Group or Voice Broadcast Call state attribute presentation |
| RIL_GetNCHSupportIndication | +CANCHEV | This API retrieves NCH support indication |
| RIL_SetNCHSupportIndication | +CANCHEV | This API sets NCH support indication |
| RIL_GetOriginatorDispatcherInfo | +COTDI | This API retrieves originator to dispatcher information |

TABLE 3-continued

APIs of Voice Group Call Service and Voice Broadcast Service

| API | AT Command | Description |
| --- | --- | --- |
| RIL_SetOriginatorDispatcherInfo | +COTDI | This API sets originator to dispatcher information |
| RIL_GetVGCSGroupStatusList | +CGCS | This API retrieves a list of VGCS group status |
| RIL_SetVGCSGroupStatus | +CGCS | This API sets status for one VGCS group |
| RIL_GetVBSGroupStatusList | +CBCS | This API retrieves a list of VBS group status |
| RIL_SetVBSGroupStatus | +CBCS | This API sets status for one VBS group |

What is claimed:

1. A radio interface layer (RIL) for interfacing a computer to a telephony radio on a mobile network, the RIL comprising:
   a proxy layer;
   a driver layer; and
   a set of application programming interfaces (APIs) for abstracting out multiple radio technologies including 2G and 3G technologies without knowledge of the telephony radio or mobile network, said set of APIs comprising APIs for performing UMTS functions including 2G and 3G switching;
   wherein, when the proxy layer receives a call at a first interface to one of the set of APIs, the proxy layer transforms the API call to a command understood by the driver layer and sends the command to the driver layer at a second interface,
   wherein the driver layer receives the command at the second interface and determines at least one standard telephony radio command corresponding to the called API and sends the telephony radio command to the telephony radio at a third interface; and
   wherein the driver layer provides notification when the telephony radio changes between the multiple radio technologies including GSM and UMTS.

2. The RIL of claim 1, wherein the proxy layer is hardware independent.

3. The RIL of claim 2, wherein the driver layer is hardware specific.

4. The RIL of claim 1, further comprising a set of APIs for performing WCDMA-related functions.

5. The RIL of claim 1, further comprising a set of APIs for performing HSDPA -related functions.

6. The RIL of claim 1, further comprising a set of APIs for performing GSM-related functions.

7. The RIL of claim 1, further comprising a set of APIs for performing GPRS-related functions.

8. The RIL of claim 1, wherein the set of APIs include UMTS packet domain APIs.

9. The RIL of claim 1, wherein the set of APIs include call control and network service APIs.

10. The RIL of claim 1, wherein the set of APIs include voice group call service and voice broadcast service APIs.

11. A method of communicating between a module and a radio comprising:
   providing a set of application programming interfaces (APIs) for abstracting out multiple radio technologies including 2G and 3G technologies without knowledge of the telephony radio or mobile network, said set of APIs comprising APIs for performing UMTS functions including 2G and 3G switching;
   generating a radio interface layer (RIL) API call at one of a plurality of modules to perform a UMTS function;
   sending the RIL API call to a proxy at a first interface;
   at the proxy, converting the RIL API call to a command understood by a radio driver;
   transmitting the radio driver command from the proxy to the radio driver at a second interface;
   transmitting a radio command from the radio driver to the radio at a third interface;
   performing the UMTS function at the radio; and
   at the driver, providing notification to the module when the radio changes between a plurality of radio technologies including GSM and UMTS.

12. The method of claim 11, wherein the UMTS function includes 3G QoS.

13. The method of claim 11, wherein the UMTS function includes secondary PDP context.

14. The method of claim 11, wherein the UMTS function includes voice group call service.

15. The method of claim 11, wherein the UMTS function includes voice broadcast call service.

16. The method of claim 11, wherein the proxy is hardware independent and the driver is hardware specific.

17. A radio interface layer (RIL) of a telephone for facilitating communications between an application program module and a radio, comprising:
   a proxy layer for communicating with the application program module at a first interface;
   a driver layer at a second interface; and
   a set of application programming interfaces (APIs) for abstracting out multiple radio technologies including 2G and 3G technologies without knowledge of the telephony radio or mobile network, said set of APIs comprising APIs for performing UMTS functions including 2G and 3G switching,
   wherein the proxy layer provides the set of APIs on the first interface for receiving application program calls to perform a UMTS function and wherein the proxy layer transforms the API calls to an input/output control (IOCTL) code and sends the IOCTL code to the driver layer at the second interface,
   wherein the driver layer communicates with the proxy layer at the second interface and the radio at a third interface, the driver layer receiving an IOCTL code at the second interface and transforming the IOCTL code into a command understood by the radio to perform the UMTS function and sending the command at the third interface; and
   wherein the driver layer provides notification to the application program module when the radio changes between a plurality of radio technologies including GSM and UMTS.

18. The RIL of claim 17, wherein the command is an AT command based on 3GPP specification TS 27.007.

19. The RIL of claim 17, wherein the command is associated with a private API set defined by the radio manufacturer.

* * * * *